United States Patent [19]

Schrolucke

[11] 4,076,339
[45] Feb. 28, 1978

[54] AIR BEARING ASSEMBLY FOR ROTATIONAL TABLE

[75] Inventor: Virgil H. Schrolucke, Bradenton, Fla.

[73] Assignee: National Automatic Tool Company, Inc., Richmond, Ind.

[21] Appl. No.: 760,748

[22] Filed: Jan. 19, 1977

[51] Int. Cl.² ............................................. F16C 17/00
[52] U.S. Cl. ....................................... 308/9; 90/58 B; 308/DIG. 1
[58] Field of Search .................... 308/9, 135, DIG. 1; 277/DIG. 5; 90/58 B; 51/240 T

[56] References Cited

U.S. PATENT DOCUMENTS

| | | | |
|---|---|---|---|
| 3,146,037 | 8/1964 | Hooker | 308/9 |
| 3,708,215 | 1/1975 | Wilcock et al. | 308/9 |
| 3,871,721 | 3/1975 | Siebert | 308/9 |
| 3,910,650 | 10/1975 | Kraus | 308/9 |

Primary Examiner—Trygve M. Blix
Assistant Examiner—Charles E. Frankfort
Attorney, Agent, or Firm—Allegretti, Newitt, Witcoff & McAndrews

[57] ABSTRACT

An improved air bearing assembly for rotatably supporting a rotary table of a machine on a fixed base. The bearing assembly includes a fixed annular bearing member which has an upper face and a lower face. The upper face has a surface area which is greater than the lower face. A rotatable annular bearing member is positioned in nesting and rotational relationship with the fixed bearing member. The rotatable bearing member has an upper surface and a lower surface with the lower surface having a greater surface area than the upper surface. The bearing members are operatively positioned and received in a space provided between the base and the rotatable table. Air conduits are provided for imparting pressurized air between the rotatable member and the base so that the force of the air pressure lifts the rotatable bearing member upwardly, thereby defining an air bearing between the base and the rotatable bearing member while the upper surface of the rotatable bearing member bears forcibly upwardly against the lower surface of the rotatable table and moves rotationally therewith while lifting. Air conduits are also provided in the fixed annular member for communicating pressurized air between the upper face of the fixed annular member and the rotary table so that the air pressure defines an air bearing between the table and the fixed annular bearing member.

7 Claims, 8 Drawing Figures

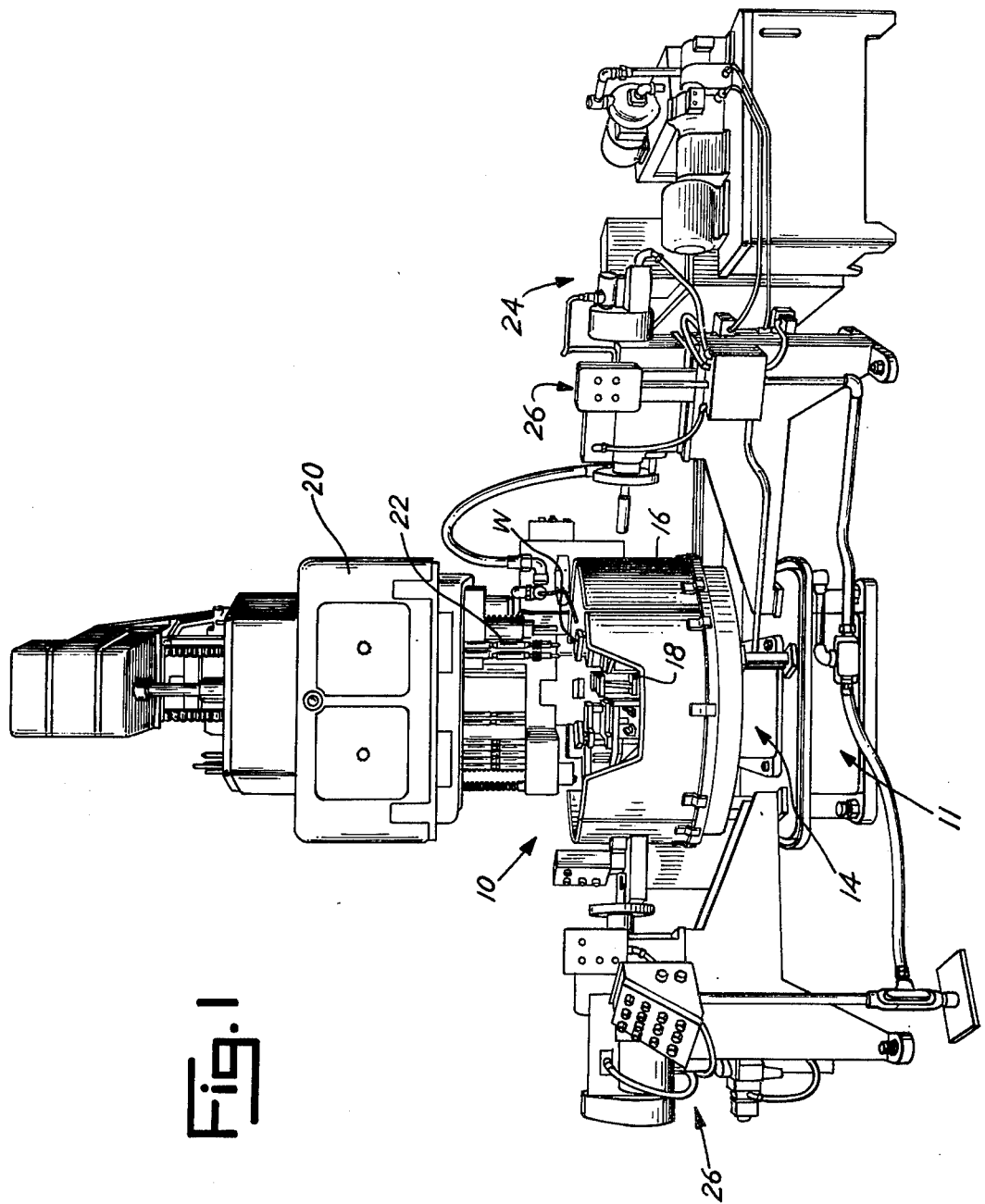

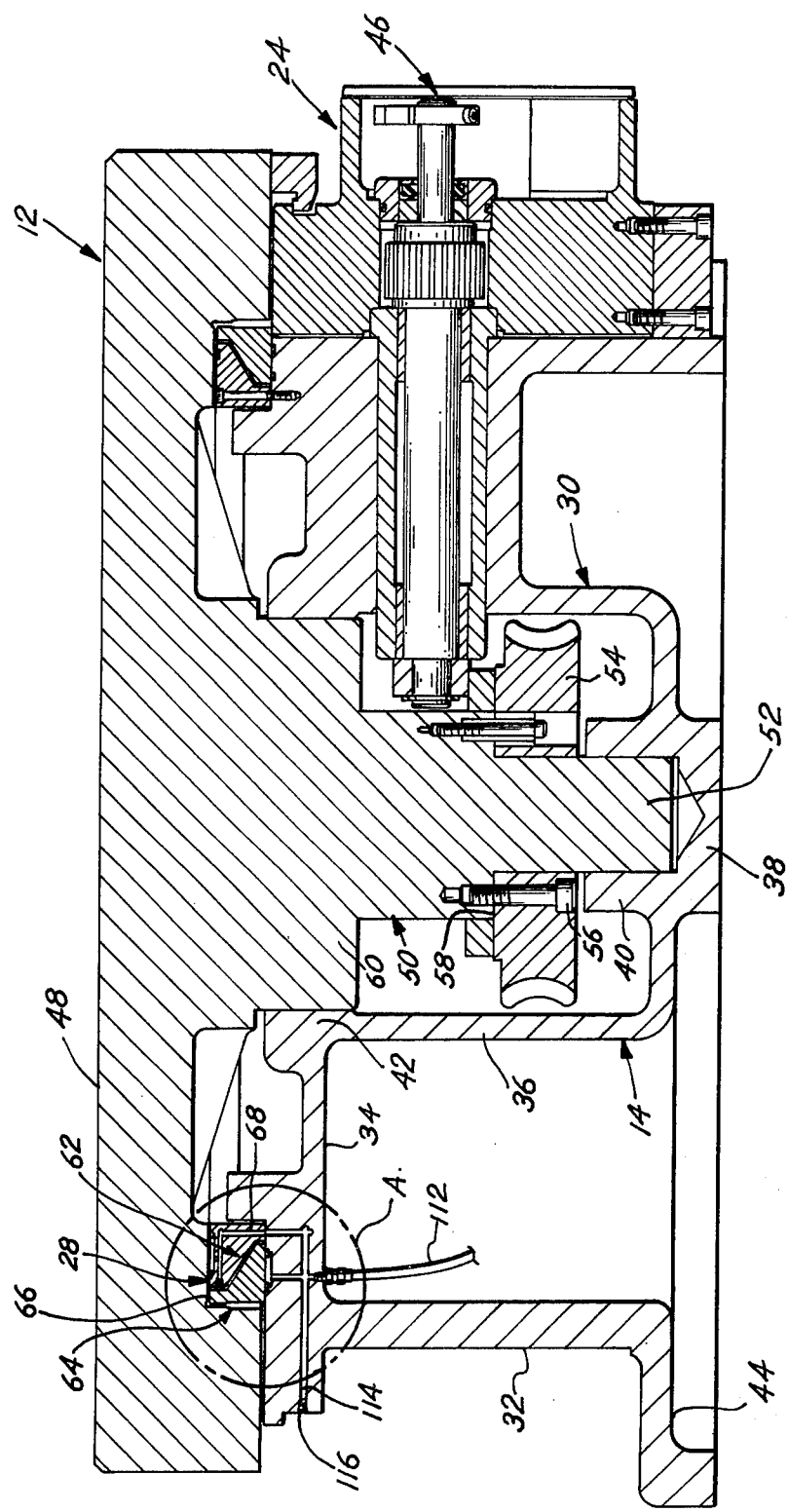

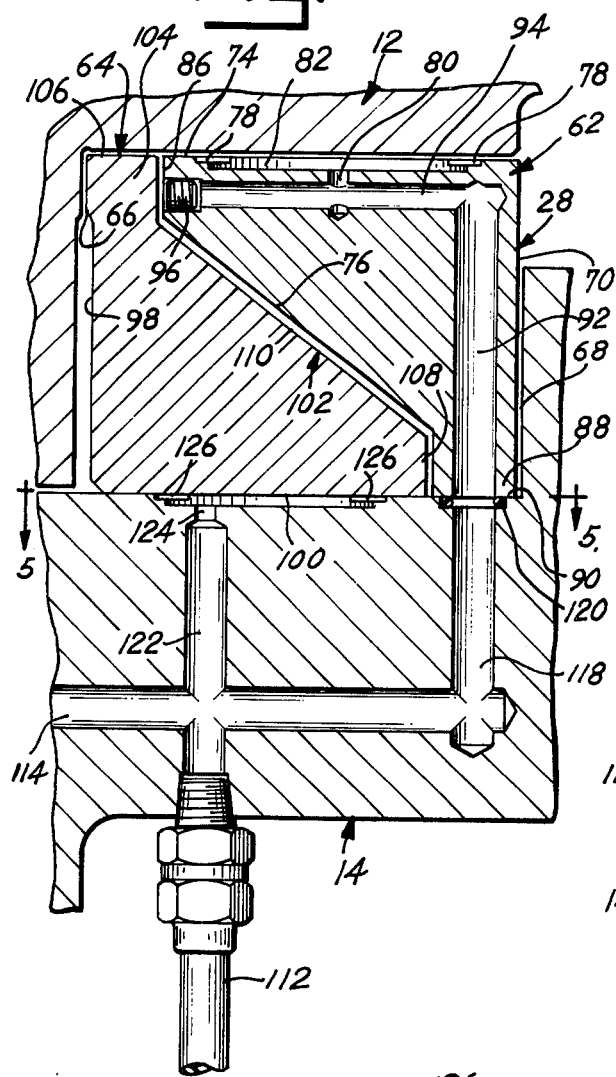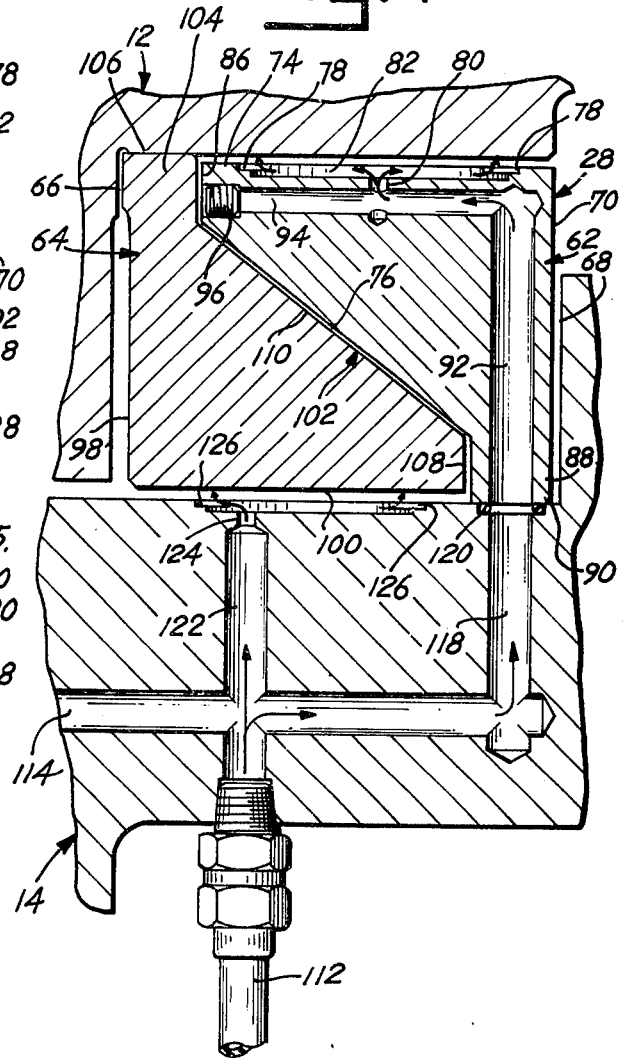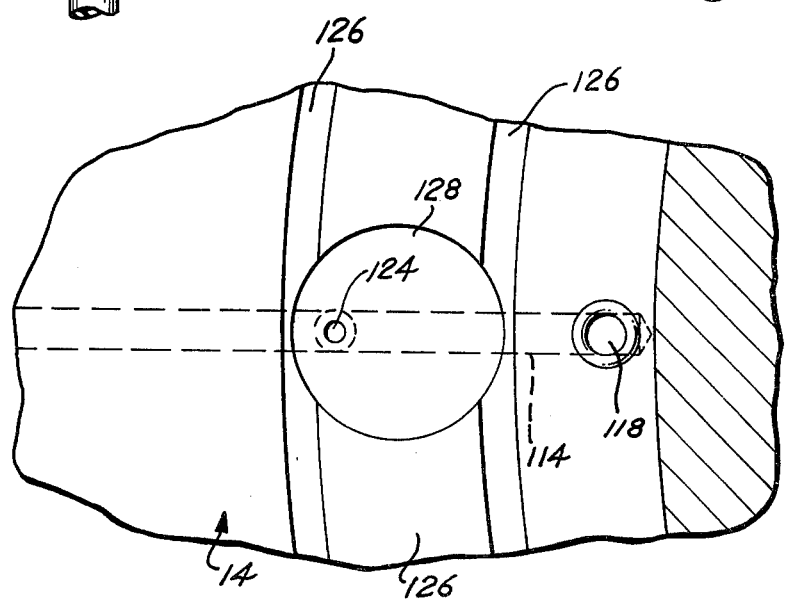

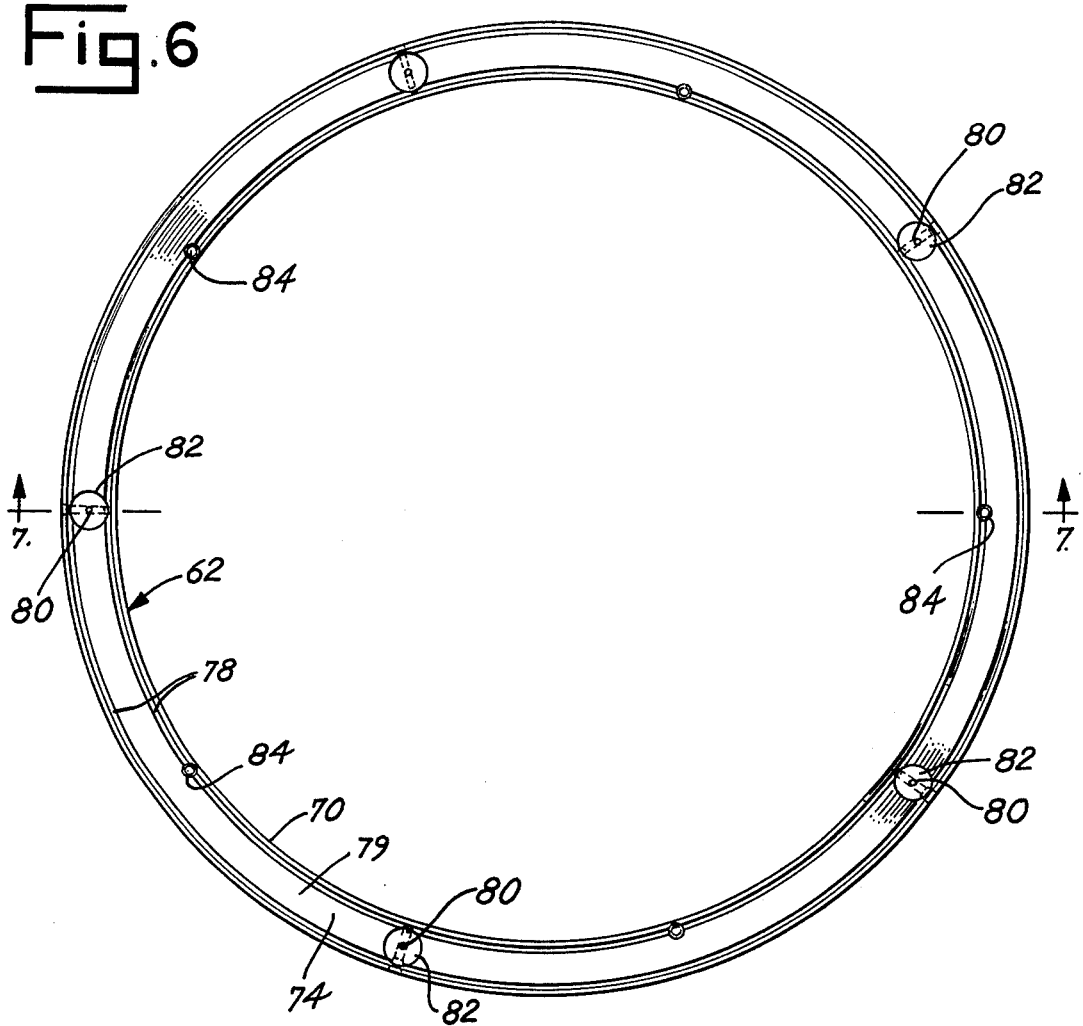
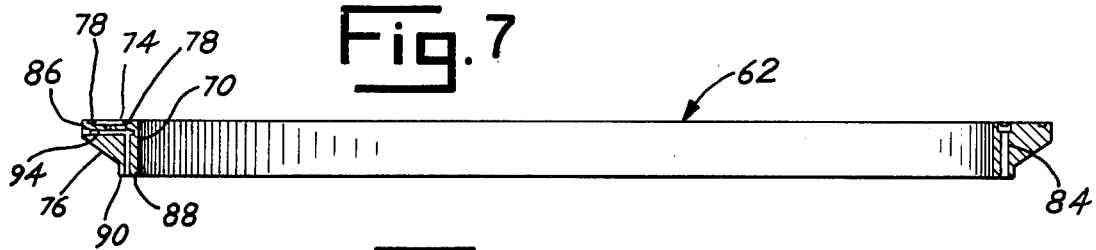
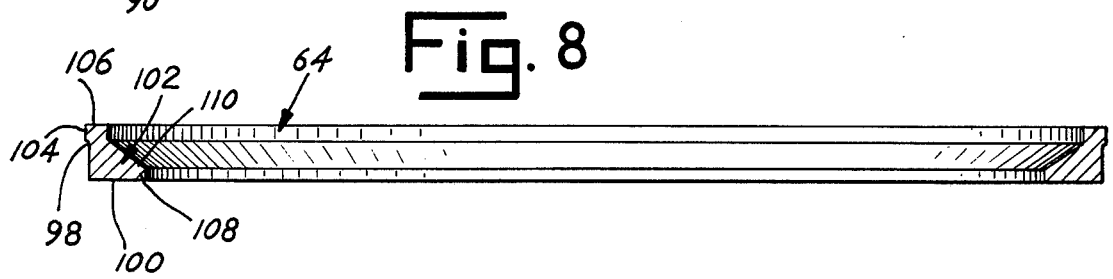

AIR BEARING ASSEMBLY FOR ROTATIONAL TABLE

BACKGROUND OF THE INVENTION—FIELD OF THE INVENTION AND DESCRIPTION OF THE PRIOR ART

This invention relates to an improved bearing assembly for use with a rotary table of the type used on heavy machinery, and it particularly relates to an improved air bearing assembly wherein the effective air bearing lift area is greater than conventional prior art air bearings or airings.

Rotary tables are commonly used with various types of heavy machinery. One such use of rotary tables is in machines wherein each of a plurality of workpieces is moved by indexing from station to station for one or more machining operations thereon, such as drilling, boring, facing, tapping and the like. In such equipment, the workpieces are mounted on fixtures which are arcuately spaced from each other and fixed to the upper surface of a rotary table. The table is rotatably indexed intermittently so that the workpieces are moved under the tools carried on the head of the machine, where the various machining operations are carried out.

Typically, a rotary table is rotatably supported on a base by an antifriction thrust bearing, such as a ball bearing or a roller bearing. Such tables and thereby the bearings therefore are large. For example, it is common to have a 100 inch diameter for the working surface of the rotary table. Such machines are important production machines and any unscheduled down time for such machines as a result of failure of any part of the machines can be extremely costly because of the lost production time. One critically important part of such equipment, which is not only expensive but also has a long delivery term, is the antifriction bearing used to rotatably support the table on the base.

Because of inherent disadvantages of antifriction roller or ball thrust bearings, these bearings have been replaced by air bearings or "airings" wherein air pressure is used to form a bearing between the table and the base so that the rotatable table, in effect, "floats" above the upper surface of the base. These bearings have generally comprised a fixed annular or ring like member having a substantially rectangular cross-sectional shape. The lower surface of the air bearing member rests on the base while the upper surface thereof is positioned below the rotary table. Air pressure is applied through the bearing and air pressure is imparted between the upper surface of the bearing and the lower surface of the rotary table so that air pressure acting on the available surface generates the desired lift force to lift the table which, in effect, floats on air. One significant limitation of these air bearings is that there is only limited area available which may function as the bearing lift area. Therefore, the air pressure may have to be increased so as to support the larger, heavier tables. If the air pressure has to be increased above the available plant air pressure to generate sufficient lift force, the advantage of an air bearing may be lost or the use of an air bearing may be totally unfeasible.

SUMMARY OF THE INVENTION

It is therefore an important object of this invention to provide an improved air bearing assembly for providing greater lift for a rotary table of a machine than is possible in conventional air bearings.

It is also an object of this invention to provide an improved air bearing for use with a rotary table of a machine wherein a pair of nesting and cooperating annular bearings are provided, with one of the bearing members being fixed while the other is rotatable, while both members cooperate to provide lift force to lift the table from the base.

It is a further object of this invention to provide a unique air bearing arrangement which is characterized by its simplicity in construction and design and reliability in operation.

It is still another object of this invention to provide an improved air bearing arrangement for rotatably supporting a rotary table on a fixed base of a heavy machine wherein greater lift force is provided for lifting the table than possible with the prior art air bearings which have substantially the same exterior dimensions.

Further purposes and objects of this invention will appear as the specification proceeds.

The foregoing objects are accomplished by providing an improved air bearing assembly for supporting a rotary table on a fixed base wherein the improved air bearing assembly includes a fixed annular bearing member having an upper face and a lower face, the upper face having a surface area greater than the lower face, a rotatable annular bearing member being in nesting and rotational relationship wih the fixed bearing member, the rotatable bearing member having an upper surface and a lower surface, the lower surface having a greater surface area than the upper surface, the bearing members being positioned in a space between the base and the rotatable member, and air conduits being provided for applying pressurized air between the lower surface of the rotatable bearing member and the base, the pressurized air lifting the rotatable bearing member upwardly for defining an air bearing between the base and the rotatable member while the upper surface of the rotatable bearing member moves upwardly against the rotary table for lifting thereof and for rotational movement therewith and the pressurized air further adding pressurized air between the fixed rotatable bearing member and the table for defining an air bearing space between the table and the fixed annular bearing member.

BRIEF DESCRIPTION OF THE DRAWINGS

One particular embodiment of the present invention is illustrated in the accompanying drawings wherein:

FIG. 1 is a pictorial view of a machine utilizing a rotary table carrying multiple workpiece holding fixtures for intermittent rotational movement below overhead work stations mounted on the machine;

FIG. 2 is an upright cross-sectional view through a portion of the machine shown in FIG. 1, illustrating the rotary table, the base therefor, the arrangement for rotating the table, and the air bearing assembly embodying my invention;

FIG. 3 is an enlarged, broken view of the air bearing assembly encircled by the circle A, the bearing being shown with the table in the rest position;

FIG. 4 is a view similar to FIG. 3 illustrating the position of the air bearing assembly during the rotational movement of the rotary table;

FIG. 5 is a broken cross-sectional view taken along the line 5—5, of FIG. 3;

FIG. 6 is a top plan view of the fixed annular bearing member which defines one part of my improved air bearing assembly;

FIG. 7 is a cross-sectional view taken along the line 7—7, of the fixed bearing of FIG. 6; and FIG. 8 is a cross-sectional view through the rotatable bearing portion of the air bearing assembly which cooperates with the fixed annular bearing member.

DETAILED DESCRIPTION OF THE PREFERRED EMBODIMENT

Referring to FIG. 1, there is shown a pictorial view of multiple position machine tool, genrally 10, which includes a rotary table, generally 12, of the type shown in FIG. 2. The rotary table assembly, generally 12, is rotatably supported on a fixed base, generally 14. The entire rotary table assembly 12, rests on main machine base 11. Referring again to FIG. 1, an upright wall or enclosure 16 is securely mounted on the base 14 so as to act as a splash guard for the lubricant or coolant which is conventionally directed against the workpiece W during the machining operation. Each workpiece is mounted on a fixture 18, each of which is fixedly mounted on the upper surface of the rotary table 12 in arcuately spaced relationship. An overhead frame or support head, generally 20, is secured to the machine base 11 and projects upwardly therefrom at the rear portion thereof, so that the working tools, generally 22, may be positioned over the workpieces W carried on the rotary table 12. Auxiliary equipment, including a drive arrangement, generally 24, and controls therefor, generally 26, are provided for operating the machine 10.

It is to be understood that a preferred use of my improved bearing assembly, generally 28, is with a machine 10 of the type shown herein, that is, a machine which utilizes a rotary table 12 carrying multiple workpieces W for indexing or intermittent rotary movement below one or more sets of working tools 22 carried on the head 20. It is to be further understood, however, that my bearing assembly 28 may be utilized in connection with other types of equipment which utilize a rotary table on a base. Thus, the machine 10 illustrates only one preferred type of high production machine which conventionally utilizes a roller or ball type of thrust bearing for rotatably supporting a rotary table 12 on a fixed base 14, and which utilizes an air bearing or airing.

Referring to FIG. 2, the structural relationship between the rotary table 12, the base 14, and the bearing assembly 28 which rotatably supports the table 12 on the base 14, is shown in greater detail.

The base 14 includes a hollow central annular section 30, an outer wall section 32, and a rigid transverse flange 34, for unitarily interconnecting the central section 30 to the outer wall 32. The central section 30 is defined by a cylindrical upright wall 36, which is spaced radially inwardly from the outer wall 32, and a horizontal bottom wall 38, thereby defining a hollow central chamber in the base 14. A central upright cylindrical wall 40 of reduced height relative to the wall 36 is positioned within the central section 30. The upper portion of the wall 36 terminates in a generally cylindrical bearing flange 42, adjacent the interconnecting flange 34. The outer wall 32, as seen in the left hand side of the embodiment of FIG. 2, terminates in a lower flange 44 which is at the same level as the bottom wall 38. The left half section of the flange 34, as seen in FIG. 2, generally comprises a rigid horizontal unitary wall which interconnects the upper ends of the cylindrical outer wall 32 to the upright wall 36 of the central section 30.

The right half portion of the embodiment of FIG. 2 illustrates a portion of the shot bolt and down clamp mechanism, generally 46, located in the base 14. A separate indexing mechanism (not shown), which is of conventional design, is provided for rotatably indexing the table 12.

The rotary table 12 includes a generally circular horizontal upper section 48 and a unitary downwardly projecting central cylindrical column 50. The outer portions of the circular table section 48 are generally positioned above the flange section 42 of the base 14. The central downwardly projecting column 50 of the table includes a bottom section 52 of reduced diameter which is rotatably received within the central upright wall 40, which acts as a support bearing, for permitting relative rotational movement between the wall 40 and the column section 52.

A driven annular gear 54 is rigidly secured to the central column 50 of the table 12, as by the use of a plurality of bolts 56. The bolts 56 are passed vertically upwardly through the gear 54 and are received within the annular wall 58 defined by the lower section 52 of the column 50. The gear 54 is operatively driven by a worm (not shown) which is driven by the indexing drive (not shown).

The table 12 includes an intermediate outwardly stepped portion 60 which defines a cylindrical outer bearing surface which is positioned adjacent the bearing surface defined by the flange 42 of the inner wall 40 of the central portion 30 for permitting supported rotational movement therebetween. The cooperation of the intermediate section 60 of the rotary table with the flange 42 and the cooperation of the central annular wall 40 with the lower column section 52 provides for a lateral bearing support for the rotary table 12 on the base 14. The vertical rotary bearing support for the table 12 on the base 14 is provided solely by the bearing assembly 28 which is the subject of the invention herein.

As seen best in FIGS. 3, 4 and 6, the bearing assembly 28 generally comprises a fixed, non-rotatable inner bearing ring member 62 and a rotatable outer bearing ring, generally 64. The fixed inner ring 62 and the rotatable outer ring 64 are constructed and arranged to be in a nesting, proximate relationship to each other so as to define a substantially rectangular cross-section for the nesting rings 62 and 64 in the assembled position.

A pair of cooperating annular seats 66 and 68, are provided, respectively, on the lower portion of the circular section 48 of the table 12 and on the upper portion of the base 14. The seats 66 and 68 define a substantially rectangular space for receiving the bearing assembly 28 therein. When in the nesting and cooperating relationship, the fixed inner ring 62 and rotary outer ring 64 have a cross-sectional shape which is substantially the same as the rectangular cross-sectional space defined by the annular cooperating seats 66 and 68.

Referring to FIGS. 3, 6 and 7, the fixed inner ring 62 includes an upright cylindrical inner surface 70, a top surface 74, and an intermediate section 76 which interconnects the top surface 74 with the inner surface 70 thereof. The inner cylindrical surface 70 is positioned adjacent the upright wall defining the seat 68.

The top surface 74, as seen in FIGS. 6 and 7, has two peripheral shallow grooves 78 which, as will be described, act as channels for pressurized air passing therein. A plurality of arcuately spaced upright air outlet openings 80 are located in the land 79, the air outlet openings 80 being located in shallow wells 82 of enlarged diameters provided in the land 79. A plurality of apertures 84 are spaced intermediate the well 82 and air inlets 80. The apertures 84 receive bolts (not shown) which secure the fixed ring 62 to the base 14.

The intermediate section 76 which interconnects the inner surface 70 and the top surface 74 is sloped or slanted for the central part of its length so as to define a frusto-conical shape. The secton 76 includes an upper outer cylindrical section 86 and a lower and inner cylindrical section 88, which are interconnected by the frusto-conical section thereof. The lower and inner cylindrical section 88 defines a downwardly facing annular surface 90 which is positioned above the upper surface of the base 14.

As seen best in FIGS. 3 and 4, a plurality of upright air apertures 92 pass upwardly from the lower surface 90, terminating just below the upper surface 74 of the fixed ring 62. A plurality of transverse conduits 94 pass laterally from the upper end of the upright apertures 92 for communication with the air outlets 80 which are directed to the air well 82 in the fixed ring 62. The end of the conduit 94 which terminates at the outer and upper cylindrical section 86 is closed by a plug 96. The wells 82 intersect and overlap grooves 78, providing a free path for air to communicate with the grooves 78.

The outer ring 64 of the bearing assembly 28, as seen in FIGS. 3 and 4, is in nesting relationship with the fixed inner ring 62. The rotatable outer ring 64 includes a substantially cylindrical outer wall 98, an annular bottom surface 100 and an intermediate section 102 which interconnects the outer surface 98 with the bottom surface 100 and which is complementary to the frusto-conical portion of the intermediate surface 76 of the fixed inner ring 62. The intermediate section 102 includes an upper cylindrical section 104 which defines an upper surface 106 adjacent the upper portion of the cylindrical outer section 98. An inner lower cylindrical section 108 of the rotatable ring 64 is complementary with the lower cylindrical section 88 of the fixed inner ring 62. A frusto-conical surface 110 interconnects the upper section 104 with the lower section 108 of the intermediate lower section 102. The outer ring 64 is not fixed to either the inner ring 62, the table 12, or the base 14.

Referring to FIGS. 3 and 4, the table 12 has an air line 112 which communicates with a transverse conduit 114 in the base 14 for adding pressurized air thereinto. As seen in FIG. 2, the outer end of the transverse conduit 114 is closed by a plug 116. The transverse conduit 114 communicates with a first upright conduit 118 which is in direct alignment with the upright air aperture 92 in the fixed ring 62. A sealing O-ring 120 is positioned intermediate the upper surface of base 14 and the lower edge 90 of the fixed ring 62 in order to effect a seal therebetween so as to permit the pressurized air to pass upwardly through the air conduit 92 and ultimately to the air outlets 80. Each transverse conduit 114 intercommunicates with a second upright conduit 122 which terminates in an air outlet 124 at the upper end of the conduit 122 in the base section 14. Each of the air outlets 124 are arcuately spaced and communicate with an air well 128 provided in the upper surface of the base 14 and surrounding each of the air outlets 124. Each well communicates with annular grooves in the upper surface of the base 14.

The operation of the bearing assembly 28 may be best understood by referring particularly to FIGS. 3 and 4. When the rotary table 12 of the machine 10, as shown in FIG. 1, is to be indexed through a preselected angle of rotation, so as to move a workpiece W from one work station to another work station, an appropriate signal commences the rotation of the table 12 relative to the base 14. Substantially simultaneously with rotation, suitable controls (not shown) direct pressurized air, as plant pressurized air of, for example, 30 - 40 PSI, is passed through the air lines 112 so that the air pressure passes upwardly through a plurality of the upright apertures 118 in the base 14, which, in turn, communicate with the upright conduits 92 in the fixed ring 62 so that the pressurized air ultimately passes through the plurality of arcuately spaced air inlets 80 provided in the wells 82 for communication to the grooves 78, to thereby act forcibly upwardly, as seen in FIG. 4, directly against the underside of the rotary table 12, thereby effecting an air cushion or air bearing between the top surface of the fixed ring 62 and the underside of the table 12. Since an air pressure of approximately 30 PSI, for example, acts against the entire area equivalent to the cross-sectional area of the top surface 74 of the fixed ring 62, which area may be in the order of, for example, 400 square inches, for a relatively large diameter rotary table, such as a 4 - 6 foot diameter table 12, the lift force of the pressurized air may readily be in excess of 10,000 pounds per ring element, and even above 20,000 pounds per ring element. Air exhausts from the normal clearance space between the table and the base.

Similarly, pressurized air passes upwardly through the upright conduit 122 which is directed into the annular grooves 126 in the upper surface of the base 14 to act against the underside of the rotatable ring 64, again providing a lifting force of several thousand pounds. As seen in FIG. 3, in the rest position, the top edge 106 of the rotatable ring 64 is spaced downwardly from the table 12. Also, the frusto-conical portion of the intermediate section 76 of the fixed ring 62 is spaced upwardly from the frusto-conical surface 110 of the rotatable ring 64. In this way, when a lift force acts against the rotatable ring 64, the entire ring 64 is lifted upwardly so that the frusto-conical surfaces are in spaced relationship and the top surface 106 of the rotatable ring bears upwardly against the table 12 with several thousand pounds of force which, as mentioned above, is directly related to the amount of air pressure acting on the area of the bottom of the surface 100 of the rotatable ring 64. The upper surface 106 bears upwardly against the table 12, having moved upwardly until it is in contact with the underside of the table 12. As the table 12 rotates, the outer bearing ring 64 while applying a lifting force to the table 12 also rotates therewith because of the frictional force acting between the table 12 and the upper surface 106 of the rotatable outer ring 64.

The air flow openings 80 and 124 are sized so that, if they blow freely to the atmosphere, as when the table tips high on one side from a load imbalance, the escaping air does not cause a pressure drop through the remaining openings sufficient to prevent functions of the air bearing. Also, the pressure increases at the operating openings, and the load thereby tends to be brought back into balance.

It is seen that the combined bearing lifting effect of the air bearing assembly 28 is almost doubled as compared to prior art devices wherein a unitary ring having substantially the same transverse cross-section as the bearing assembly 12 provided in the applicant's invention. My unique air bearing 28 accomplishes substantially all of the foregoing objects. It is to be understood that the applicant's invention is not limited to the use of only one set of two bearing rings as, in certain applications, additional pairs of such cooperating rings may be provided to accomplish the desired results. The bearing assembly 28 also would have deflections less than conventional rolling element bearings. Rolling element bearings have certain inherent disadvantages because of high stresses, and corresponding high deflections as the volume of material under stress at the load transfer sites is relatively small. In contrast, the air bearing assembly 28, when at rest, the load resisting elements have the same elasticity moduli as those of conventional thrust bearings, but the load carrying cross-sections are thousands of times as great; as a result, deflections are minimized. Additionally, the loads are transferred across directly opposing faces, in the same direction as the main load, and not on a bias, as with conventional thrust bearings. Therefore, the air bearing 28 has a high degree of rigidity, which is a distinct advantage.

It is to be also understood that although pressurized air is the conventional and preferred gas used for the pressurized lifting force, other pressurized gases may be used. Thus, where used in the specification and claims hereof, the term "air" is meant to include any safe, pressurized gas, although the use of a pressurized gas other than air would be very rarely, if ever, used.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. An improved bearing assembly for supporting a rotatable table on a fixed base for rotation about a substantially upright axis, said improved bearing assembly comprising, in combination, a fixed annular bearing member having an upper face and a lower face, said upper face having a surface area greater than said lower face, a rotatable annular bearing member in nesting and rotational relationship with said fixed bearing member, said rotatable bearing member having an upper surface and a lower surface, said lower surface having a greater surface area than said upper surface, said bearing members being positioned between said base and said rotatable table, and means for applying gaseous pressure between said lower surface of said rotatable hearing member, and said base, said air pressure lifting said rotatable bearing member upwardly for defining a gaseous bearing between said base and said rotatable bearing member, said upper surface of said rotatable bearing member moving upwardly against said rotatable table for simultaneous rotational movement therewith, and said gaseous pressure applying means further applying gaseous pressure between said fixed annular bearing member and said table for defining a gaseous bearing between said table and said fixed annular bearing member.

2. The bearing assembly of claim 1 wherein said fixed bearing member is located radially inwardly of said rotatable bearing member, and a portion of said fixed bearing member is positioned above a portion of said rotatable bearing member.

3. The bearing assembly of claim 2 wherein said portions of both said bearing members are frusto-conical in shape and a space is defined between said frusto-conical portions when said rotatable bearing member is not rotating.

4. The bearing assembly of claim 1 wherein said gaseous pressure applying means includes conduits defined in said base, and in said fixed bearing member.

5. The bearing assembly of claim 1 wherein said gaseous pressure applying means includes annular groove means defined between said base and said rotatable bearing member and between said table and said fixed bearing member for containing said pressurized gas.

6. The bearing assembly of claim 1 wherein said rotatable bearing member is movable in a vertical direction from a rest position against said base to an operative position when said upper surface bears upwardly against said table.

7. The assembly of claim 1 wherein said gaseous pressure applying means comprises air pressure applying means.

* * * * *